US009626182B2

United States Patent
Baumbach et al.

(10) Patent No.: US 9,626,182 B2
(45) Date of Patent: *Apr. 18, 2017

(54) SYSTEM AND METHOD FOR TRACKING SUSPICION ACROSS APPLICATION BOUNDARIES

(71) Applicant: International Business Machines Corporation, Armonk, NY (US)

(72) Inventors: Marc A. Baumbach, Apex, NC (US); Patrick J. Danford, Morrisville, NC (US); George P. DeCandio, Cary, NC (US); Christian Funkhouser, New York, NY (US); David K. Grotjohn, Cary, NC (US); Vishwanath Ramaswamy, Carlsbad Springs (CA)

(73) Assignee: International Business Machines Corporation, Armonk, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 13/787,172

(22) Filed: Mar. 6, 2013

(65) Prior Publication Data

US 2014/0258978 A1  Sep. 11, 2014

(51) Int. Cl.
*G06F 9/44* (2006.01)
*G06F 11/30* (2006.01)

(52) U.S. Cl.
CPC ............ *G06F 8/70* (2013.01); *G06F 11/3003* (2013.01); *G06F 11/3082* (2013.01); *G06F 11/3051* (2013.01); *G06F 2201/865* (2013.01)

(58) Field of Classification Search
CPC ..................................................... G06F 8/70
See application file for complete search history.

(56) References Cited

U.S. PATENT DOCUMENTS

| 7,908,583 | B2 | 3/2011 | Sengupta et al. |
| 8,196,100 | B2 | 6/2012 | Petri |
| 8,412,813 | B2* | 4/2013 | Carlson et al. ............... 709/224 |
| 2005/0033777 | A1* | 2/2005 | Moraes ............ G06F 17/30575 |
| 2006/0143685 | A1* | 6/2006 | Vasishth ............... G06F 21/577 726/1 |
| 2007/0106982 | A1* | 5/2007 | Dalal ....................... G06F 8/71 717/128 |

(Continued)

OTHER PUBLICATIONS

Dynamic hierarchical mega models: comprehensive traceability and its efficient maintenance, Seibel et al., 2010.*

(Continued)

*Primary Examiner* — Lewis A Bullock, Jr.
*Assistant Examiner* — Tina Huynh
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving, from a first and second application by a computing device, shapes of artifacts and components of the first and second application. The shapes of the artifacts and components of the first and second application are conformed to a standard format. One or more changes to the shapes of the artifacts and components of the first and second application are tracked. One or more suspicious relationships across the first and second application are displayed based upon, at least in part, the one or more changes to the shapes of the artifacts and components of the first and second application.

6 Claims, 10 Drawing Sheets

(56) References Cited

U.S. PATENT DOCUMENTS

| | | | |
|---|---|---|---|
| 2007/0143744 A1* | 6/2007 | Clemm | G06F 8/71 717/128 |
| 2007/0162522 A1* | 7/2007 | Sengupta | G06F 8/10 |
| 2008/0059977 A1 | 3/2008 | Brown et al. | |
| 2008/0276221 A1* | 11/2008 | Lev et al. | 717/120 |
| 2010/0115612 A1* | 5/2010 | O'Brien | G06F 15/0291 726/22 |
| 2011/0099516 A1* | 4/2011 | Hughes | G06F 8/61 715/810 |
| 2011/0202656 A1* | 8/2011 | Gentile | H04L 47/821 709/226 |
| 2013/0074038 A1* | 3/2013 | Fox | G06F 8/70 717/122 |
| 2013/0086556 A1* | 4/2013 | Grechanik | G06F 11/3684 717/126 |

OTHER PUBLICATIONS

Tool Support for Automated Traceability of Test/Code Artifacts in Embedded Software System, Wiederseine et al., 2011.*

* cited by examiner

| Link Types for JKE Banking (Requirements Management) | Extraction | Decomposition | Constrains | Elaborated By | Elaborates | Derives | Affected By | Embeds | Artifact Term Reference | Illustration | Implemented By | References | Link | Satisfaction | Specifies | Tracked By | Specified By | Synonym | Validated By |
|---|---|---|---|---|---|---|---|---|---|---|---|---|---|---|---|---|---|---|---|
| | Watch | Watching (702) | Watch | Watch | Watch | Watch | Watch | Watch | Watch | Watch | Watching | Watch | Watch | Watch | Watch | Watch | Watch | Watch | Watching |

Artifact Types

☑ Term
☐ User Story Elaboration
☑ Business Process
☐ Diagram
☑ Storyboard
☑ Actor  — 702
☐ Use Case Diagram

800

| Link Types for JKE Banking (Requirements Management) | |
|---|---|
| Watch | Extraction |
| Watching | Decomposition |
| Watch | Constrains |
| Watch | Elaborated By |
| Watch | Elaborates |
| Watch | Derives |
| Watch | Affected By |
| Watch | Embeds |
| Watch | Artifact Term Reference |
| Watch | Illustration |
| Watching | Implemented By |
| Watch | References |
| Watch | Link |
| Watch | Satisfaction |
| Watch | Specifies |
| Watch | Tracked By |
| Watch | Specified By |
| Watch | Synonym |
| Watching | Validated By |

| Attribute Types | In Artifact Type |
|---|---|
| ☑ Name | Business Process |
| ☐ Status | Business Process |
| ☑ Created By | Business Process |
| ☐ Artifact Format | Business Process |
| ☑ Primary Text | Business Process |
| ☑ Description | Business Process |
| ☐ Last Modified Data | Business Process |

900

702

| ▼ Link Types for JKE Banking (Requirements Management) | |
|---|---|
| Extraction | Watch |
| Decomposition | Watching |
| Constrains | Watch |
| Elaborated By | Watch |
| Elaborates | Watch |
| Derives | Watch |
| Affected By | Watch |
| Embeds | Watch |
| Artifact Term Reference | Watch |
| Illustration | Watch |
| Implemented By | Watching |
| References | Watch |
| Link | Watch |
| Satisfaction | Watch |
| Specifies | Watch |
| Tracked By | Watch |
| Specified By | Watch |
| Synonym | Watch |
| Validated By | Watching |

700

SYSTEM AND METHOD FOR TRACKING SUSPICION ACROSS APPLICATION BOUNDARIES

BACKGROUND

Throughout the software development lifecycle, items (e.g., requirements, implementation work items, and test cases) may be defined to help guide the software development efforts to a meaningful end product. However, as work is done at each stage of the software development process, the items may evolve from their initial state. For instance, relationships between each item (e.g., a test case which validates a requirement) may become invalid as the requirement evolves.

Furthermore, the items in question may be contained by separate solutions. For example, one application may contain the requirements, another application may contain the test cases, and yet another application may contain the implementation work items. It may be possible for these applications each to provide the ability to allow linking from their contained artifact types to artifacts contained by each other application; however, each application may be responsible for tracking changes in its own contained resources, and may be unaware of changes outside of this scope.

Additionally, managing change between many items (e.g., documents) from several users may be a difficult and time consuming process. By using "suspicion flags" to mark documents as suspect across, e.g., traceability links between the documents, a user may find it easier to see the impact of such changes. However, situations may arise where a change may cause an artifact on the other end of a traceability link to become suspect, which may result in suspicion flags being raised when the associated change may be minor or not important.

BRIEF SUMMARY OF DISCLOSURE

In one implementation, a method, performed by one or more computing devices, comprises receiving, from a first and second application by a computing device, shapes of artifacts and components of the first and second application. The shapes of the artifacts and components of the first and second application are conformed to a standard format. One or more changes to the shapes of the artifacts and components of the first and second application are tracked. One or more suspicious relationships across the first and second application are displayed based upon, at least in part, the one or more changes to the shapes of the artifacts and components of the first and second application.

One or more of the following features may be included. The shapes may include a description of a format of a data object associated with at least one of the artifacts. A feed of the shapes of the artifacts and components of the first and second application conformed to the standard format may be generated. The one or more changes to the shapes of the artifacts and components of the first and second application may be tracked from the feed. A centralized application may track the one or more changes to the shapes of the artifacts and components of the first and second application. At least one change of the one or more changes to the shapes of the artifacts and components of the first and second application may be determined to match criteria in a suspect profile of a plurality of suspect profiles. Displaying may include displaying the at least one change of the one or more changes to the shapes of the artifacts and components of the first and second application, and may include displaying the suspect profile of the plurality of suspect profiles of which the criteria matches the at least one change.

In another implementation, a computing system includes a processor and a memory configured to perform operations comprising receiving, from a first and second application, shapes of artifacts and components of the first and second application. The shapes of the artifacts and components of the first and second application are conformed to a standard format. One or more changes to the shapes of the artifacts and components of the first and second application are tracked. One or more suspicious relationships across the first and second application are displayed based upon, at least in part, the one or more changes to the shapes of the artifacts and components of the first and second application.

One or more of the following features may be included. The shapes may include a description of a format of a data object associated with at least one of the artifacts. A feed of the shapes of the artifacts and components of the first and second application conformed to the standard format may be generated. The one or more changes to the shapes of the artifacts and components of the first and second application may be tracked from the feed. A centralized application may track the one or more changes to the shapes of the artifacts and components of the first and second application. At least one change of the one or more changes to the shapes of the artifacts and components of the first and second application may be determined to match criteria in a suspect profile of a plurality of suspect profiles. Displaying may include displaying the at least one change of the one or more changes to the shapes of the artifacts and components of the first and second application, and may include displaying the suspect profile of the plurality of suspect profiles of which the criteria matches the at least one change.

In another implementation, a computer program product resides on a computer readable storage medium that has a plurality of instructions stored on it. When executed by a processor, the instructions cause the processor to perform operations comprising receiving, from a first and second application, shapes of artifacts and components of the first and second application. The shapes of the artifacts and components of the first and second application are conformed to a standard format. One or more changes to the shapes of the artifacts and components of the first and second application are tracked. One or more suspicious relationships across the first and second application are displayed based upon, at least in part, the one or more changes to the shapes of the artifacts and components of the first and second application.

One or more of the following features may be included. The shapes may include a description of a format of a data object associated with at least one of the artifacts. A feed of the shapes of the artifacts and components of the first and second application conformed to the standard format may be generated. The one or more changes to the shapes of the artifacts and components of the first and second application may be tracked from the feed. A centralized application may track the one or more changes to the shapes of the artifacts and components of the first and second application. At least one change of the one or more changes to the shapes of the artifacts and components of the first and second application may be determined to match criteria in a suspect profile of a plurality of suspect profiles. Displaying may include displaying the at least one change of the one or more changes to the shapes of the artifacts and components of the first and second application, and may include displaying the suspect profile of the plurality of suspect profiles of which the criteria matches the at least one change.

The details of one or more implementations are set forth in the accompanying drawings and the description below. Other features and advantages will become apparent from the description, the drawings, and the claims.

BRIEF DESCRIPTION OF THE DRAWINGS

FIG. 7 is an illustrative diagrammatic view of a screen image displayed by the tracking process of FIG. 1 according to one or more implementations of the present disclosure;

FIG. 8 is an illustrative diagrammatic view of a screen image displayed by the tracking process of FIG. 1 according to one or more implementations of the present disclosure;

FIG. 9 is an illustrative diagrammatic view of a screen image displayed by the tracking process of FIG. 1 according to one or more implementations of the present disclosure.

Like reference symbols in the various drawings indicate like elements.

DETAILED DESCRIPTION

Figure 1:
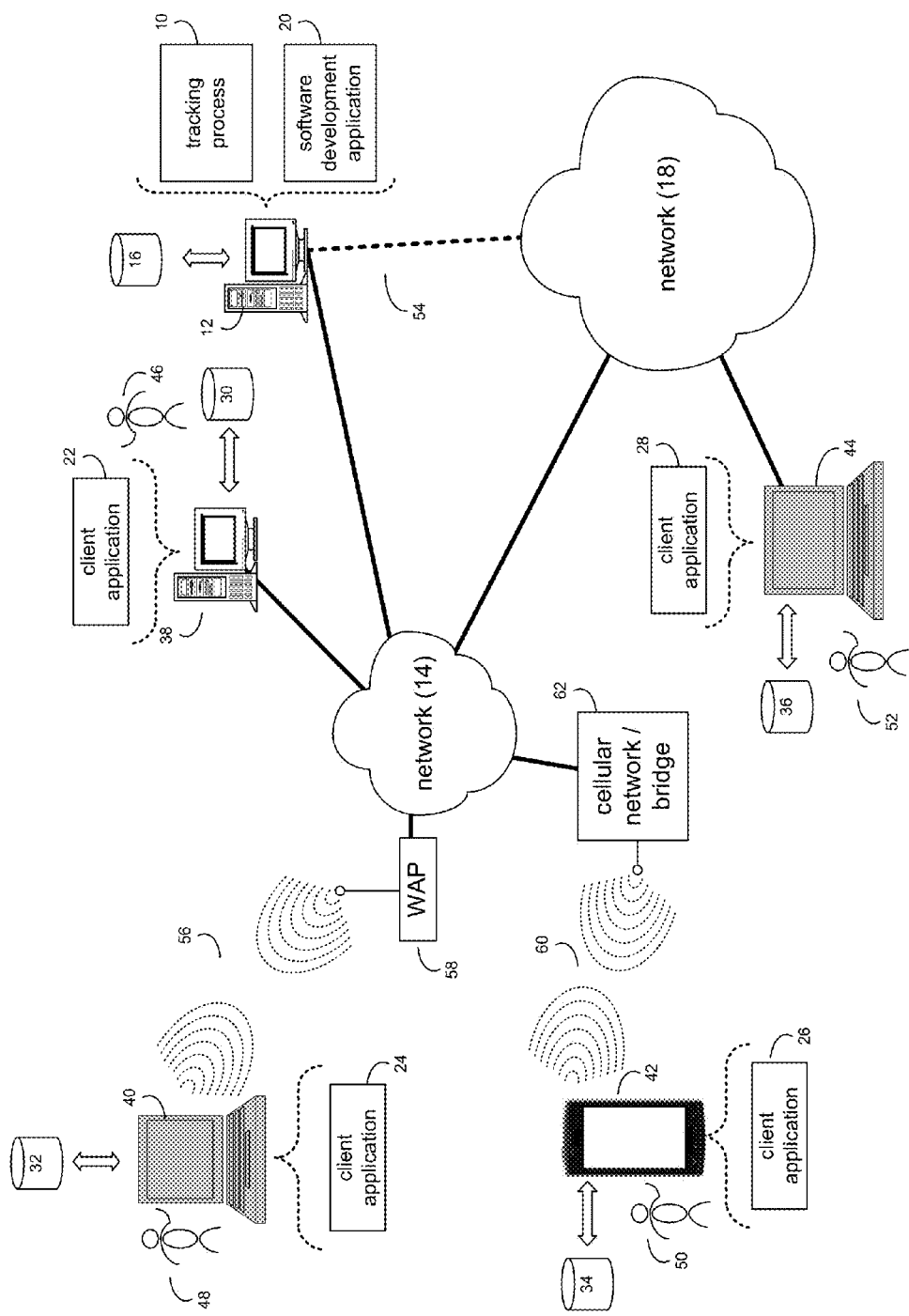
FIG. 1 is an illustrative diagrammatic view of a tracking process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown tracking process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, tracking process 10 may receive, from a first and second application by a computing device, shapes of artifacts and components of the first and second application. The shapes of the artifacts and components of the first and second application may be conformed to a standard format. One or more changes to the shapes of the artifacts and components of the first and second application may be tracked. One or more suspicious relationships across the first and second application may be displayed based upon, at least in part, the one or more changes to the shapes of the artifacts and components of the first and second application.

As will also be discussed below in greater detail, tracking process 10 may generate a first suspect profile of a plurality of suspect profiles that includes one or more characteristics, wherein the first suspect profile may be associated with a traceability link between at least two artifacts. A change to a first characteristic associated with a first artifact of the at least two artifacts may be determined. Which of the plurality of suspect profiles includes the first characteristic may be determined. The first characteristic may be matched to the first suspect profile of the plurality of suspect profiles based upon, at least in part, determining that the first suspect profile includes the first characteristic. The traceability link may be marked as suspect based upon, at least in part, matching the first characteristic to the first suspect profile The instruction sets and subroutines of tracking process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Tacking process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a software development application (e.g., software development application 20), examples of which may include, but are not limited to, e.g., a collaborative lifecycle management application(s), or other application that allows for the defining, the collaboration, and/or the management of software development using, e.g., requirements, test cases, and work items. Tracking process 10 and/or software development application 20 may be accessed via client applications 22, 24, 26, 28. Tracking process 10 may be a stand alone application, or may be an applet/application/script that may interact with and/or be executed within software development application 20 and/or one or more of client applications 22, 24, 26, 28. Software development application 20 may be a stand alone application, or may be an applet/application/script that may interact with and/or be executed within tracking process 10 and/or one or more of client applications 22, 24, 26, 28. One or more of client applications 22, 24, 26, 28 may be a stand alone application, or may be an applet/application/script that may interact with and/or be executed within tracking process 10 and/or software development application 20. Examples of client applications 22, 24, 26, 28 may include, but are not limited to, e.g., a collaborative lifecycle management application(s), or other application that allows for the defining, the collaboration, and/or the management of software development using, e.g., requirements, test cases, and work items, a standard and/or mobile web browser, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of tracking process 10 (and vice versa). Accordingly, tracking process 10 may be a purely server-side application, a purely client-side application, or a hybrid server-side/client-side application that is cooperatively executed by one or more of client applications 22, 24, 26, 28 and/or tracking process 10.

One or more of client applications 22, 24, 26, 28 may be configured to effectuate some or all of the functionality of software development application 20 (and vice versa). Accordingly, software development application 20 may be a purely server-side application, a purely client-side application, or a hybrid server-side/client-side application that is cooperatively executed by one or more of client applications 22, 24, 26, 28 and/or software development application 20. As one or more of client applications 22, 24, 26, 28, tracking process 10, and software development application 20, taken singly or in any combination, may effectuate some or all of the same functionality, any description of effectuating such functionality via one or more of client applications 22, 24, 26, 28, tracking process 10, software development application 20, or combination thereof, and any described interaction(s) between one or more of client applications 22, 24, 26, 28, tracking process 10, software development application 20, or combination thereof to effectuate such functionality, should be taken as an example only and not to limit the scope of the disclosure.

Users 46, 48, 50, 52 may access computer 12 and tracking process 10 (e.g., using one or more of client electronic devices 38, 40, 42, 44) directly through network 14 or through secondary network 18. Further, computer 12 may be connected to network 14 through secondary network 18, as illustrated with phantom link line 54. Tracking process 10 may include one or more user interfaces, such as browsers and textual or graphical user interfaces, through which users 46, 48, 50, 52 may access tracking process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
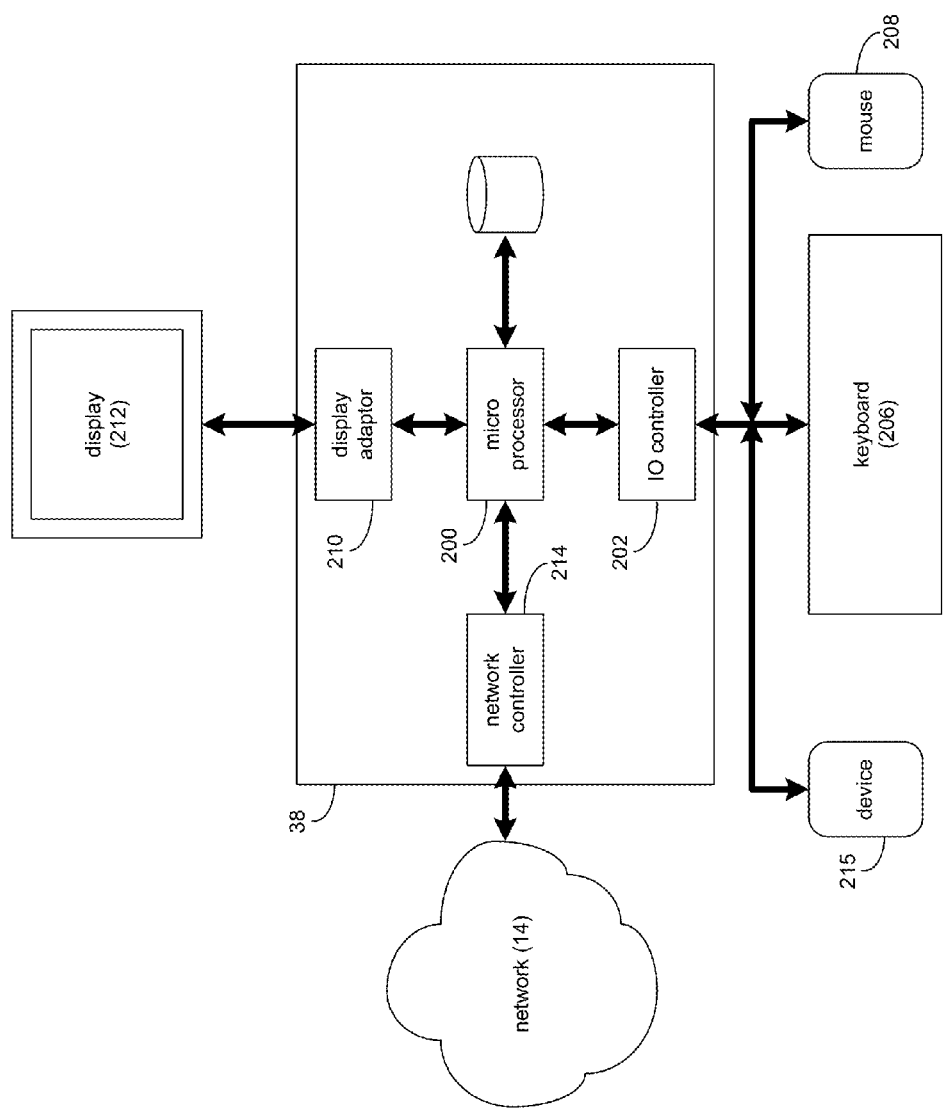
FIG. 2 is a diagrammatic view of a client electronic device of FIG. 1 according to one or more implementations of the present disclosure.
Figure 3:
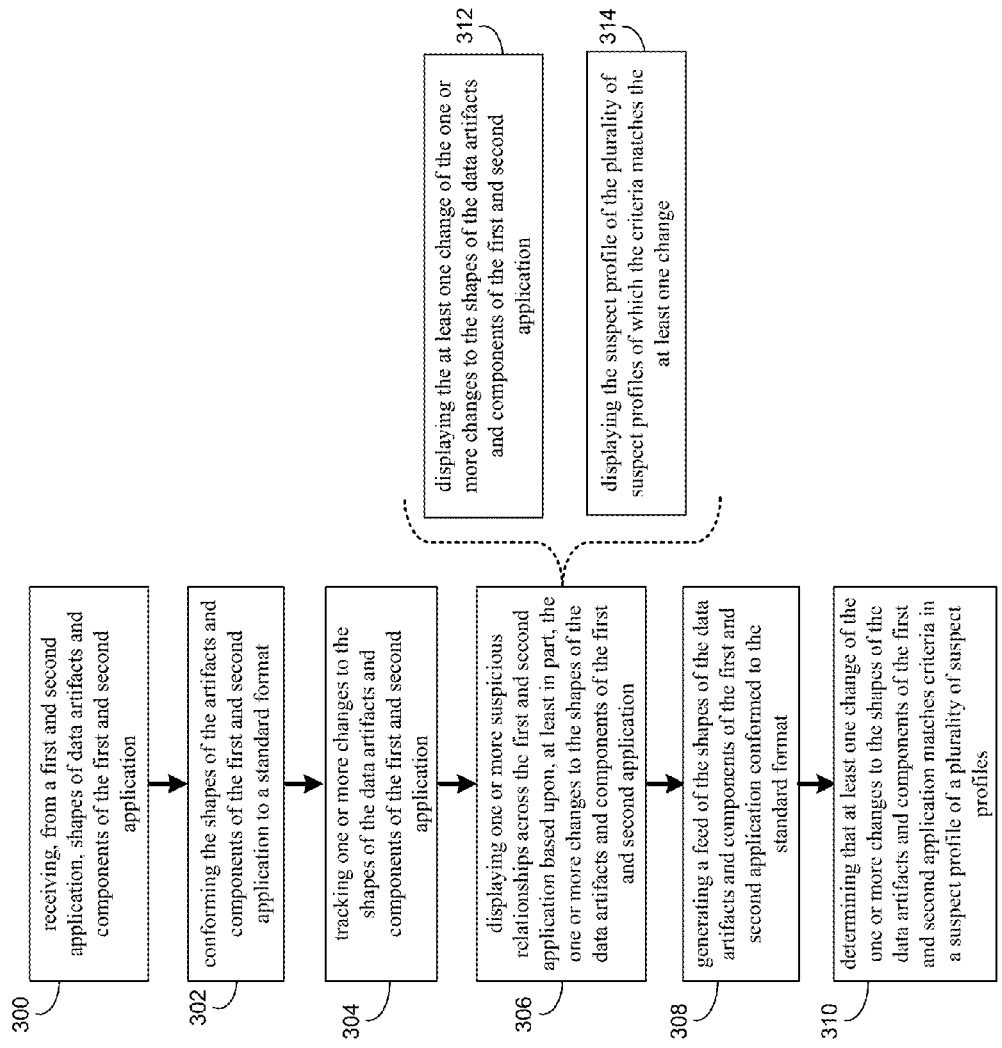
FIG. 3 is an illustrative flowchart of the tracking process of FIG. 1 according to one or more implementations of the present disclosure.
Figure 4:
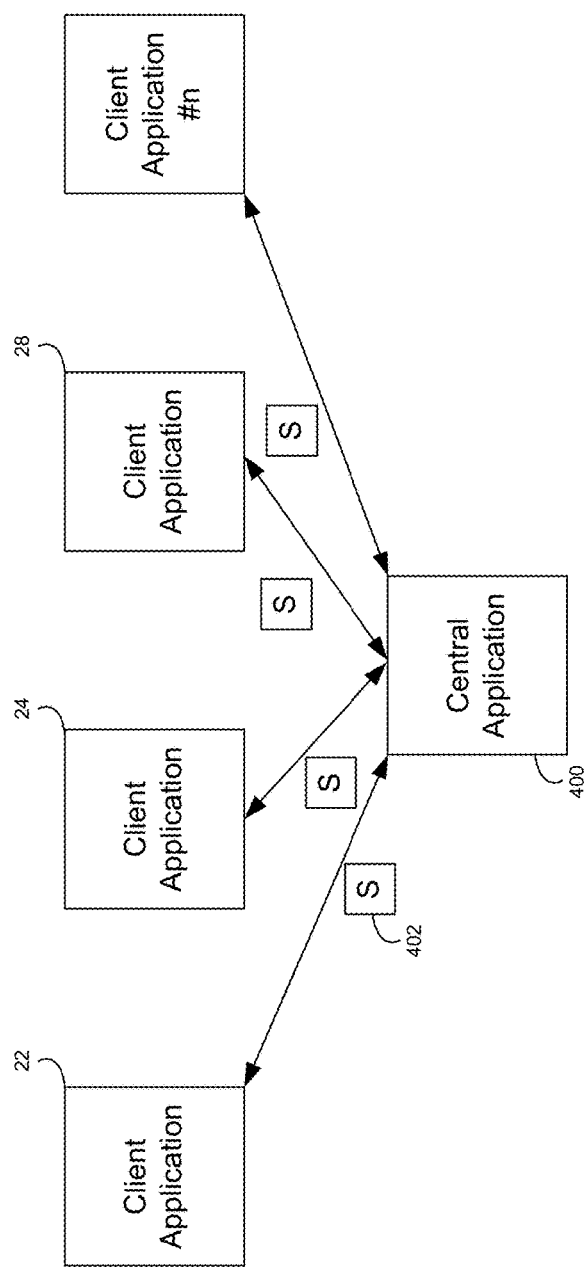
FIG. 4 is an illustrative alternative diagrammatic view of the tracking process of FIG. 1 coupled to the distributed computing network according to one or more implementations of the present disclosure.
Figure 5:
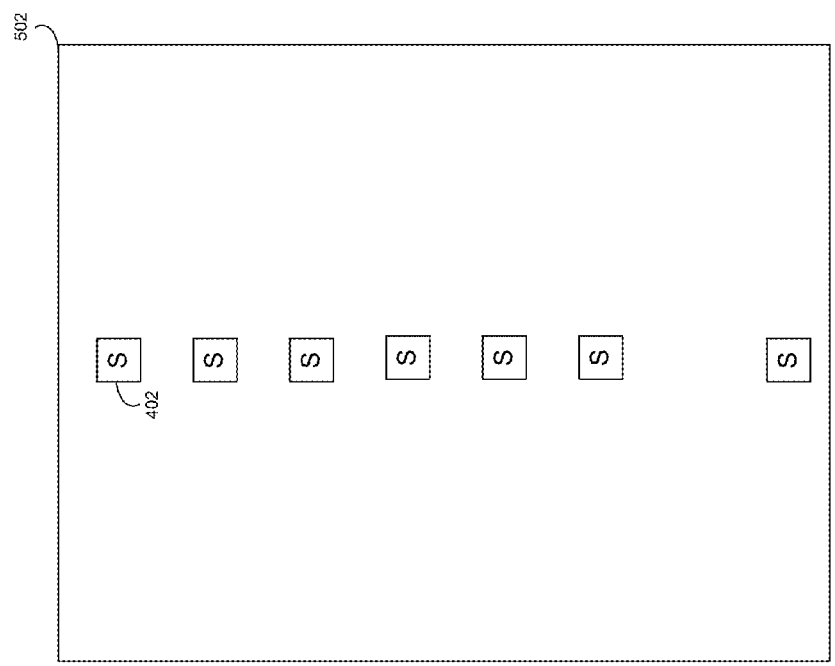
FIG. 5 is an illustrative diagrammatic view of a feed produced by the tracking process of FIG. 1 according to one or more implementations of the present disclosure
Figure 6:
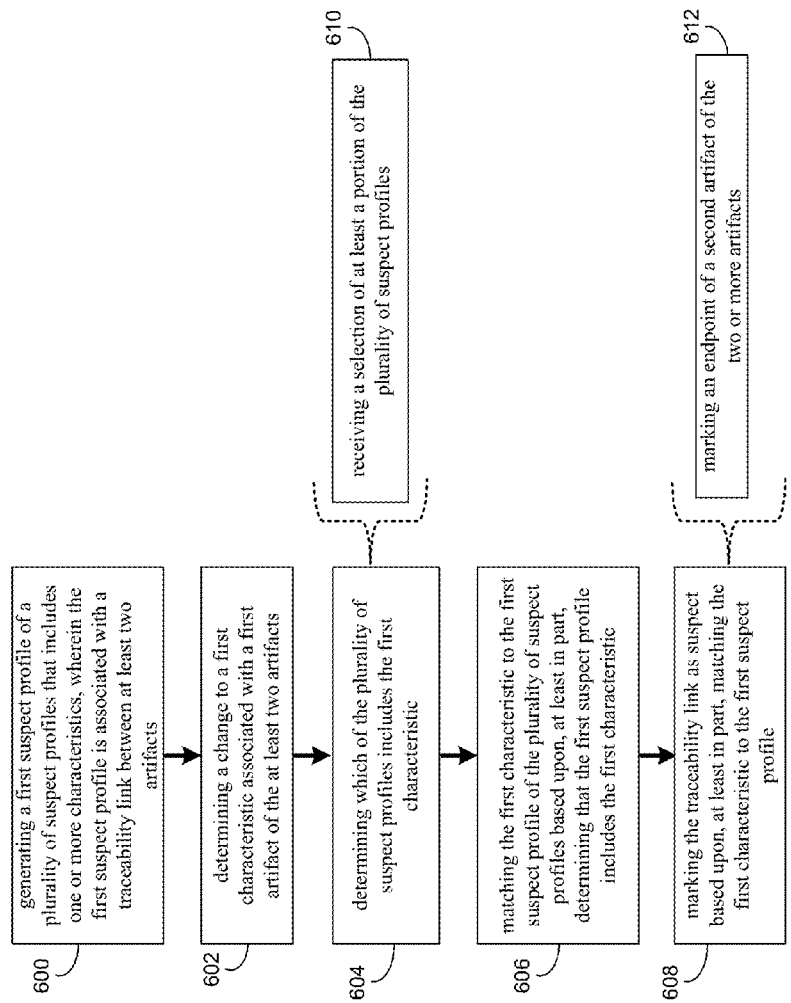
FIG. 6 is an illustrative flowchart of the tracking process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, tracking process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As will be discussed in greater detail below, tracking process 10 may track the relationships between (and/or changes to) artifacts and/or components within applications with linked data, such that suspicious relationships may be managed across the application boundary without requiring the individual applications to be aware of changes to artifacts and/or components within related applications.

The Tracking Process (I):

As discussed above and referring also to FIGS. 3-10, tracking process 10 may receive 300, from a first and second application by a computing device, shapes of artifacts and components of the first and second application. The shapes of the artifacts and components of the first and second application may be conformed 302 to a standard format by tracking process 10. One or more changes to the shapes of the artifacts and components of the first and second application may be tracked 304 by tracking process 10. One or more suspicious relationships across the first and second application may be displayed 306 by tracking process 10 based upon, at least in part, the one or more changes to the shapes of the artifacts and components of the first and second application.

Assume for example purposes only that a software development project is underway. In the example, multiple applications may be used in the software development process. For instance, and referring at least to FIG. 4, client application 22 (e.g., a requirements composer application) may have access to requirements for the software development project that may be stored in, e.g., storage device 30, client application 24 (e.g., a quality manager application) may have access to test cases for the software development project that may be stored in, e.g., storage device 32, and client application 28 (e.g., a team concert application) may have access to implementation work items for the software development project that may be stored in, e.g., storage device 36. Other examples of client applications having access to various other aspects of the software development project may be used without departing from the scope of the disclosure.

In some implementations, tracking process 10 may receive 300, from a first and second application by a computing device (e.g., computer 12), shapes of artifacts and components of the first and second application. For example, tracking process 10 may receive 300 shapes of artifacts and components (e.g., shape 402) from client application 22 associated with requirements for a particular software development project and may receive 300 shapes of artifacts and components from client application 24 associated with test cases for the same software development project. In some implementations, the shapes may include a description of a format of a data object associated with at least one of the artifacts. For example, the format of the data object may include the format of the data object content (e.g., text, image, binary data, etc.), attributes of the data object, possible values for each attribute, links that may be valid for the data object, etc.

The shape may also include a description of available properties and link types. For example, a "Requirement Shape" may include properties such as but not limited to priority, status, and iteration. The "Requirement Shape" may have links such as but not limited to implemented by, parent of, and related to. A data object may include a particular description of a shape, and it may be possible to have multiple "data objects" that may be implementations of the same shape. For example, a "System Requirement" data object may be a concrete form of a "Requirement Shape". It may have some additional properties besides the ones described in the shape, but it at least may include those properties and links described in the shape. Another example may be a "User Requirement." Again, it may have all of the properties described in the shape, but may include additional ones that may make it different than a "System Requirement".

In some implementations, artifacts and components may be similar (or the same). For example, artifacts/components may include the specific documents that may be a type of data object. For instance, there may be 4 requirements in a particular project, e.g.: "User Requirement 1", "User Requirement 2", "System Requirement 3", and "System Requirement 4." They each may have values for the various properties described by their data object type. For example, "User Requirement 1" may have a priority value of "High" and "User Requirement 2" may have a priority value of "Low." In terms of an example standard format, the shapes may be described in a standard application/rdf+xml format, although other formats may also be used without departing from the scope of the disclosure. An example using XML may include, e.g.:

```
<shape id="Requirement">
    ! <property>priority</property>
    ! <property>status</property>
    ! <property>iteration</property>
</shape>
```

In the example, any document that declares it uses the shape "Requirement," tracking process 10 may expect to have those three properties in it. For example:

```
<artifact>
    ! <shape type="Requirement"/>
    ! <title>User Requirement 1</title>
    ! <priority>High</priority>
    ! <status>In Progress</status>
    ! <iteration>Milestone 2</iteration>
</artifact>
```

In some implementations, the shapes of the artifacts and components of the first and second application may be conformed 302 to a standard format by tracking process 10.

In some implementations, one or more changes to the shapes of the artifacts and components of the first and second application may be tracked 304 by tracking process 10. For example, a centralized application may track 304 the one or more changes to the shapes of the artifacts and components of the first and second application. For instance, tracking process 10 may include a central application (e.g., central application 400), which may include a third party application. For example, in some implementations, a feed of the shapes of the artifacts and components of the first and second application conformed to the standard format may be generated 308 by tracking process 10. For instance, tracking process 10 may place a requirement on one or more of the above-noted client applications to expose the shapes of some or all of their respective artifacts and components, as well as some or all changes to the artifacts and the components. For example, and referring at least to FIG. 5, tracking process 10 may generate 308 a feed (e.g., feed 502) of the exposed shapes.

Any of the above-noted client applications may provide tracking process 10 with a URL that tracking process 10 (e.g., via a central repository) may know to check on an interval (for example, every 5 minutes, tracking process 10 may visit the URLs for some or all of the above-noted client applications). When a particular URL is visited, the associated client application may provide tracking process 10 with a list of changes artifacts. For example, one of the above-noted client applications may include a Requirements application that may provide the URL http://www.ibm.com/rm/changefeed. When tracking process 10 via the central repository "hits" that particular URL, the above-noted Requirements application may return a document like:

```
<changefeed>
    ! <modify id="4">http ://www.ibm.com/rm/requirements/ 1</modify>
    ! <modify id="3">http ://www.ibm.com/rm/requirements/2</modify>
```

```
! <delete id="2">http ://www.ibm.com/rm/requirements/3</delete>
! <create id="1 ">http ://www.ibm.com/rm/requirements/1</create>
</changefeed>
```

This feed may be read by tracking process 10 from top to bottom listing the changes that may have happened from most recent to least recent (or some other ordering style). In this example, it shows the most recent change was that the artifact at the URL http://www.ibm.com/rm/requirements/1 was modified. Tracking process 10 (e.g., via the central repository) may keeps track of the last "id" in that change feed to determine if any changes have occurred since it last checked.

In some implementations, the feed may be displayed, e.g., via a user interface 500 associated with tracking process 10. In the example, the one or more changes to the shapes of the artifacts and components of the first and second application may be tracked from the feed. For example, tracking process 10 may consume the shapes of the above-noted artifacts and components, and may track 306 the changes published by the various client applications. That is, tracking process 10 may consume the shapes by, e.g., downloading the above-noted documents that describe the shapes and then use those documents to help understand the resources being shown (e.g., rendered) in the feed (e.g., change log).

In some implementations, one or more suspicious relationships across the first and second application may be displayed 306 by tracking process 10 based upon, at least in part, the one or more changes to the shapes of the artifacts and components of the first and second application. For example, at least one change of the one or more changes to the shapes of the artifacts and components of the first and second application may be determined 310 by tracking process 10 to match criteria in a suspect profile of a plurality of suspect profiles. For instance, as will be discussed in greater detail below, when a data artifact or component is recognized as having changed, links to other artifacts may be inspected by tracking process 10, and if a link type that matches a suspect profile is found (e.g., by tracking process 10 comparing the link type and/or the change to a plurality of suspect profiles to ascertain if the link type and/or the change match one or more of the suspect profiles), the changes may be compared to certain criteria. If the changes match the criteria in the profile, the relationship may be marked as suspect and the suspect state may be stored in the suspect application by tracking process 10.

Displaying 306 (e.g., in the above-noted user interface) may include displaying 312 the at least one change of the one or more changes to the shapes of the artifacts and components of the first and second application, and may include displaying 314 the suspect profile of the plurality of suspect profiles of which the criteria matches the at least one change. For example, as will be discussed in greater detail below, to represent suspicion of a relationship within the individual client applications, tracking process 10 may poll the individual (suspect) client application for the suspect state. The individual (suspect) application may return to tracking process 10 information on which artifact and/or component changed, and which profile was responsible for the suspicion.

The Tracking Process (II):

As discussed above and referring also to FIGS. 3-10, tracking process 10 may generate 600, at a computing device, a first suspect profile of a plurality of suspect profiles that includes one or more characteristics, wherein the first suspect profile may be associated with a traceability link between at least two artifacts. Tracking process 10 may determine 602 a change to a first characteristic associated with a first artifact of the at least two artifacts. Tracking process 10 may determine 604 which of the plurality of suspect profiles includes the first characteristic. Tracking process 10 may match 606 the first characteristic to the first suspect profile of the plurality of suspect profiles based upon, at least in part, determining 604 that the first suspect profile includes the first characteristic. The traceability link may be marked 608 as suspect by tracking process 10 based upon, at least in part, matching the first characteristic to the first suspect profile.

In some implementations, tracking process 10 may generate 600, at a computing device (e.g., client electronic device 38), a first suspect profile of a plurality of suspect profiles that includes one or more characteristics, wherein the first suspect profile may be associated with a traceability link between at least two artifacts. A suspect profile may include a set of configuration properties (e.g., characteristics) that may define when a suspect flag is set, e.g., on documents. The use of a flag to mark suspicion should be taken as an example only and not to limit the scope of the disclosure. The one or more characteristics may include a link type. For instance, the suspect profile may enable the user (e.g., via tracking process 10) to define which types of traceability links are tracking changes and what types of changes may cause suspicion to be raised. For example, and referring at least to FIG. 7, a user interface (e.g., user interface 700) associated with tracking process 10 may enable a user to specify certain characteristics of the suspect profile to be generated 600, such as the above-noted link type. In some implementations, user 46 (e.g., via tracking process 10) may use a pointing device (e.g., curser 702) to select different link types for which changes should be tracked. In the example, user 46 uses curser 702 to select the link types to be tracked as "Decomposition", "Implemented By", and "Validated By"). In the example, changes to artifacts that are linked by "Decomposition", "Implemented By", and "Validated By" links may trigger suspicion, while changes to artifacts other than those linked by "Decomposition", "Implemented By", and "Validated By" may be insufficient to trigger suspicion.

In some implementations, the one or more characteristics may include an artifact type. In some implementations, the one or more characteristics may include an attribute type. For example, for each of the types of traceability links selected, tracking process 10 may enable user 46 to further manage, e.g., which types of documents are involved, and which attributes on a document may change to become suspect. The architecture supports both coarse and fine grained definitions to give flexibility. For instance, and referring at least to FIG. 8, user interface 700 may include an object (e.g., window 800), from which user 46 may use curser 702 to further refine which specific artifact types of each currently selected link type may trigger suspicion if changed. In the example, user 46 has selected the artifact types of "Term", "Business Process", "Storyboard", and "Actor" as the artifact types of the "Decomposition", "Implemented By", and "Validated By" link type that if changed may trigger suspicion.

As another example, and referring at least to FIG. 9, user interface 700 may include an object (e.g., window 900), from which user 46 may use curser 702 to further refine which specific attribute types (e.g., on the document) of each currently selected artifact type may trigger suspicion if changed. In the example, user 46 has selected the attribute types of "Name", "Created By", "Primary Text", and "Description" as the artifact type of the "Business Process" of the above-noted link types that if changed may trigger suspicion. In some implementations, tracking process 10 may enable user 46 (e.g., via user interface 700) to create their own link types, attribute types, artifact types, and therefore a custom suspect profile. Thus, in some implementations, rather than causing all traceability links to become suspect due to any changes in the traceability links (that may result in unnecessary notifications at times), tracking process 10 may enable user 46 to define what link type, document type, and attribute types (if any) are most relevant (at least to user 46), such that when a suspect flag is raised, there is a higher chance that it is not a minor (e.g., insignificant) change. In addition to the suspect profile definitions, suspect flags may be raised in the context of the suspect profiles. For example, documents may be suspect in certain contexts with certain suspect profiles and not in others, allowing various roles and users to have a different view of what changes are important to them.

In some implementations, the above-noted traceability link may include two or more endpoints representing the documents being linked, and the type of link representing the relationship between the documents. In some implementations, tracking process 10 may be aware of the endpoints for link types, document types, and/or attribute types, and at least a portion of the one or more characteristics may be represented as a Uniform Resource Location (URL) in the first suspect profile.

In addition to the above-description, a traceability link may broadly be described as a document that describes at least three things, e.g., a source artifact, a target artifact, and a link type. An example may include:

```
<link>
  ! <source>http://www.ibm.com/rm/requirements/1</source>
  ! <target>http://www.ibm.com/rm/requirements/2</target>
  ! <linktype>related to</linktype>
</link>
```

In the example, the document identifies that the artifact http://www.ibm.com/rm/requirements/1 is associated with the artifact http://www.ibm.com/rm/requirements/2 and the description of that association is "related to." That is, the document identifies that http://www.ibm.com/rm/requirements/1 is related to http://www.ibm.com/rm/requirements/2.

In some implementations, tracking process 10 may treat the suspect profile composites and definitions as boolean ORs. For example, a suspect profile containing two link types may consider a change as suspect if it occurs over either of the link types defined. Similarly, boolean ORs within the link type definition in the suspect profile for which document/artifact type and attribute types may cause suspicion if changed may provide similar flexibility. Tracking process 10 may further extend the above-noted logical combinations to support more complex logical combinations.

In some implementations, tracking process 10 (e.g., via software development application 20 and/or one or more of the above-noted client applications) may ensure that there is a consistently up to date and known set of traceability links between all relevant documents. This may be achieved, for example, using the above-noted feed 502 generated 308 by tracking process 10. The known traceability links may, in some instances, be an index or some data available via query from tracking process 10.

As noted above, tracking process 10 may use the suspect profiles to better define when a traceability link should be flagged as suspicious. For example, in some implementations, tracking process 10 may determine 602 that a change has occurred to a first characteristic associated with a first artifact of the at least two artifacts.

In some implementations, tracking process 10 may determine 604 which of the plurality of suspect profiles includes the first characteristic, and tracking process 10 may match 606 the first characteristic to the first suspect profile of the plurality of suspect profiles based upon, at least in part, determining 604 that the first suspect profile includes the first characteristic. For example, when a change occurs to a document and for some or all known traceability links in which the document is involved, for each suspect profile, tracking process 10 may determine whether any of the suspect profiles include a defined link type that matches the traceability links' type associated with the changed characteristic. In some implementations, determining 604 which of the plurality of suspect profiles includes the first characteristic may include receiving 610 a selection of at least a portion of the plurality of suspect profiles. For example, the suspect profiles (that may be standard suspect profiles and/or custom suspect profiles, which may be created and/or modified by a user, administrator, or the like) may be saved for later use. In the example, tracking process 10 may provide (e.g., via user interface 900) user 46 with the option (not shown) to select which suspect profile(s) to use when attempting to identify suspect traceability links. The selection may be received 610 by tracking process 10 for use in, e.g., identifying whether the above-noted characteristic change should be marked as suspect. As such, user 46 may request that tracking process 10 determine whether a particular document is suspect in the context of the selected suspect profile(s) of their choice.

In some implementations, for each matching suspect profile's link type definition that matches the link type associated with the changed document, tracking process 10 may determine whether the document types defined in the suspect profile(s) match the document that has changed and may determine whether the attribute types listed in the suspect profile(s) match the attributes that have changed in the document.

In some implementations, the traceability link may be marked 608 as suspect by tracking process 10 based upon, at least in part, matching the first characteristic to the first suspect profile. For instance, if the link type, document type, and attribute type each match the link type, document type, and attribute type included in the selected suspect profile(s), tracking process 10 may mark 608 the traceability link as suspect based upon and for the selected suspect profile. Additionally/alternatively, if only the link type and document type match the link type, document type, and attribute type included in the selected suspect profile(s) (e.g., the attribute type does not match the attribute type included in the selected profile(s)), tracking process 10 may leave the traceability link unmarked for the selected suspect profile. In the example, if the selected suspect profile(s) only define the link type and document type, then matching the link type and document type may still cause tracking process 10 to mark 608 the traceability link as suspect for the selected suspect profile. As such, at any given point in time (depending on which suspect profiles are being used), some suspect profiles may cause tracking process 10 to mark 608 the traceability link as suspect, while other suspect profiles may cause tracking process 10 to leave the traceability link unmarked.

In some implementations, marking 608 the traceability link as suspect may include marking 612 an endpoint of a second artifact of the two or more artifacts. For example, marking 608 the traceability link as suspect may include marking 608 only the endpoint of the document that was not changed. For instance, marking 608 only the endpoint of the document that was not changed may indicate that the artifact linked to the document that has not changed may need to be investigated and determined if it is still in sync with the document that has changed. The traceability link may be marked 608 as suspect in a separate resource or the same resource. The resource may include, for example, information about the traceability link (e.g., the documents involved) as well as in which suspect profile(s) the traceability link is suspect.

Figure 10:
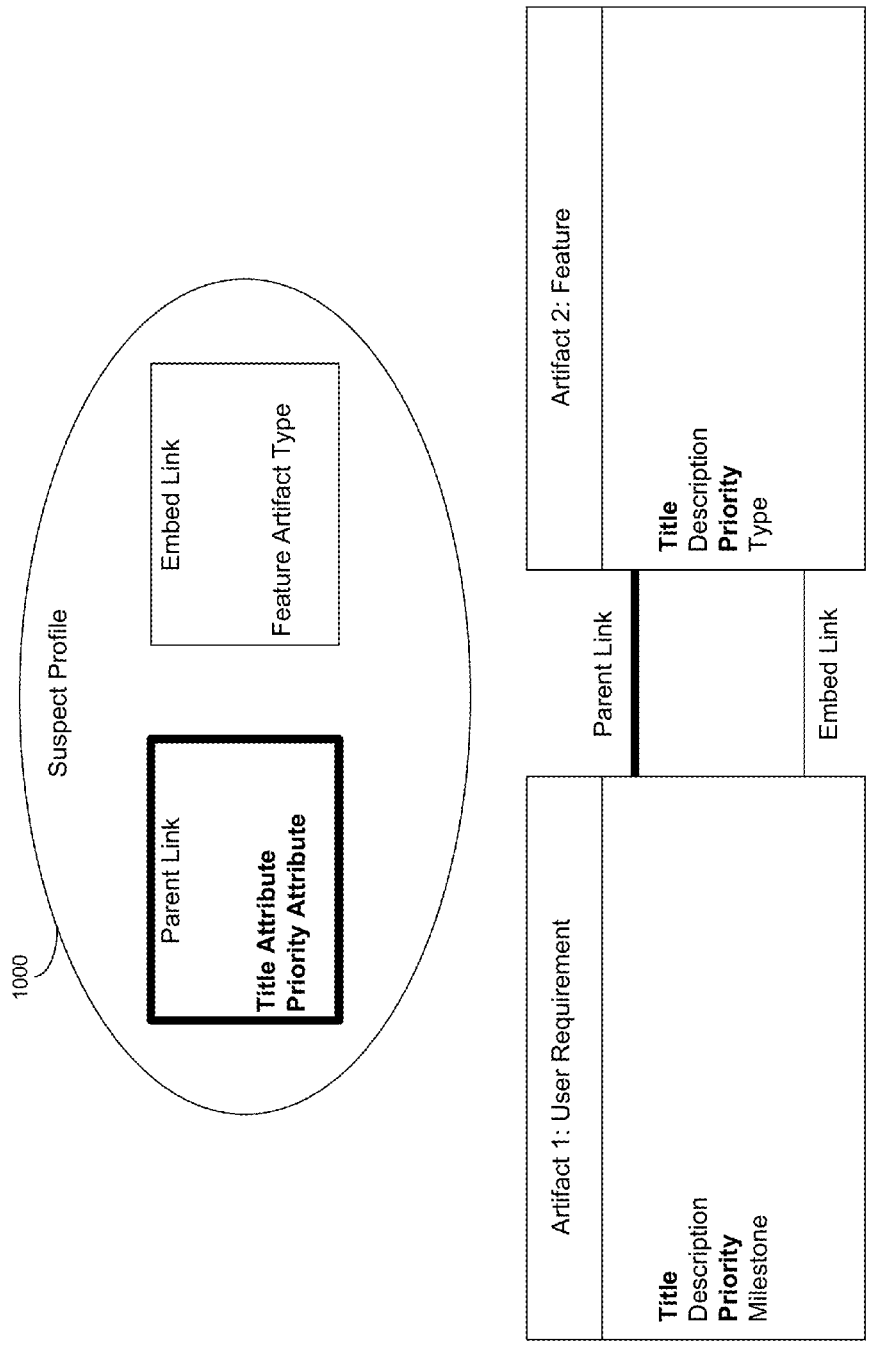
FIG. 10 is an illustrative diagrammatic view of a suspect profile generated by the tracking process of FIG. 1 according to one or more implementations of the present disclosure.

As an example of the above-discussion, and referring at least to FIG. 10, an example suspect profile (e.g., suspect profile 1000) is shown. In the example, the thickness of the lines and bolded text are indicative of where changes may occur for a suspicion marking (e.g., flag) to be raised. In the example of a traceability relationship over the link type "Parent," the suspect profile states that if the title or priority attribute change, the other end of the link should be marked 608 as suspect. In this example, if Artifact 1's priority attribute changed, Artifact 2 may become suspect for this suspect profile and marked 608 as such. Similarly, if the priority changed in Artifact 2, then Artifact 1 may become suspect and marked 608 as such.

Continuing with the example, for the traceability relationships over the "Embed" link, the suspect profile states that the change may happen for the artifact type "Feature." In the example, since no attributes are defined, any change to Artifact 2 may cause Artifact 1 to become suspect across the embed link for this suspect profile. Further in the example, Artifact 1 may not change and cause suspicion for Artifact 2 across the embed link type, as it is of the artifact type "User Requirement."

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computing system including a processor and a memory configured to perform operations comprising:
    receiving, from a first and second application, shapes of artifacts and components of the first and second application at a centralized application;
    conforming the shapes of the artifacts and components of the first and second application to a standard format;
    tracking one or more changes to the shapes of the artifacts and components of the first and second application at the centralized application, including generating a feed of the shapes of the artifacts and components of the first and second application conformed to the standard format, wherein generating the feed includes periodically checking a URL provided by one of the first and second applications, the URL providing a list of changed artifacts of one of the first and second applications;
    determining that at least one change of the one or more changes to the shapes of the artifacts and components of the first and second application matches criteria in a suspect profile of a plurality of suspect profiles, wherein the suspect profile is associated with a defined type of traceability link, wherein the defined type of traceability link describes a source artifact, a target artifact, and a link type;
    marking the traceability link including marking an endpoint of the traceability link associated with an unchanged artifact; and
    displaying one or more suspicious relationships across the first and second application based upon, at least in part, the one or more changes to the shapes of the artifacts and components of the first and second application, wherein displaying includes displaying the at least one change of the one or more changes to the shapes of the artifacts and components of the first and second application and displaying the suspect profile of the plurality of suspect profiles of which the criteria matches the at least one change.

2. The computing system of claim 1 wherein the shapes include a description of a format of data object associated with at least one of the artifacts.

3. The computer system of claim 1 wherein the one or more changes to the shapes of the artifacts and components of the first and second application is tracked from the feed.

4. A computer program product residing on a non-transitory computer readable storage medium having a plurality of instructions stored thereon which, when executed by a processor, cause the processor to perform operations comprising:
    receiving, from a first and second application, shapes of artifacts and components of the first and second application at a centralized application;
    conforming the shapes of the artifacts and components of the first and second application to a standard format;
    tracking one or more changes to the shapes of the artifacts and components of the first and second application at the centralized application, including generating a feed of the shapes of the artifacts and components of the first and second application conformed to the standard format, wherein generating the feed includes periodically checking a URL provided by one of the first and second applications, the URL providing a list of changed artifacts of one of the first and second applications;

determining that at least one change of the one or more changes to the shapes of the artifacts and components of the first and second application matches criteria in a suspect profile of a plurality of suspect profiles, wherein the suspect profile is associated with a defined type of traceability link, wherein the defined type of traceability link describes a source artifact, a target artifact, and a link type;

marking the traceability link including marking an endpoint of the traceability link associated with an unchanged artifact; and displaying one or more suspicious relationships across the first and second application based upon, at least in part, the one or more changes to the shapes of the artifacts and components of the first and second application, wherein displaying includes displaying the at least one change of the one or more changes to the shapes of the artifacts and components of the first and second application and displaying the suspect profile of the plurality of suspect profiles of which the criteria matches the at least one change.

5. The computer program product of claim 4 wherein the shapes include a description of a format of data object associated with at least one of the artifacts.

6. The computer program product of claim 4 wherein the one or more changes to the shapes of the artifacts and components of the first and second application is tracked from the feed.

* * * * *